(12) United States Patent
Kramer

(10) Patent No.: US 8,322,779 B2
(45) Date of Patent: Dec. 4, 2012

(54) COLLAPSIBLE BASE SUPPORT ASSEMBLY FOR PICKUP TRUCK CARGO BED AND TONNEAU COVER

(76) Inventor: Jerry Kramer, Atlanta, GA (US)

(*) Notice: Subject to any disclaimer, the term of this patent is extended or adjusted under 35 U.S.C. 154(b) by 0 days.

(21) Appl. No.: 13/342,140

(22) Filed: Jan. 2, 2012

(65) Prior Publication Data

US 2012/0175911 A1    Jul. 12, 2012

Related U.S. Application Data

(62) Division of application No. 12/703,822, filed on Feb. 11, 2010, now Pat. No. 8,087,716.

(51) Int. Cl.
*B62D 25/06* (2006.01)
(52) U.S. Cl. .................................... 296/185.1
(58) Field of Classification Search ............ 296/185.1, 296/182.1, 186.2, 186.5, 181.2, 181.7; 343/515
See application file for complete search history.

(56) References Cited

U.S. PATENT DOCUMENTS

| | | | | |
|---|---|---|---|---|
| 2,824,764 A * | 2/1958 | Stirling | ............ | 296/105 |
| 3,901,548 A * | 8/1975 | Seaman, Jr. | ............ | 135/88.09 |
| 4,215,894 A * | 8/1980 | Sidlinger | ............ | 296/3 |
| 4,263,925 A * | 4/1981 | Arganbright | ............ | 135/137 |
| D318,446 S * | 7/1991 | Magyar et al. | ............ | D12/403 |
| 5,056,855 A * | 10/1991 | Moravsky | ............ | 296/98 |
| 5,152,574 A * | 10/1992 | Tucker | ............ | 296/100.18 |
| 5,186,513 A * | 2/1993 | Strother | ............ | 296/100.15 |
| 5,203,364 A * | 4/1993 | Koole | ............ | 135/148 |
| 5,364,154 A * | 11/1994 | Kaiser | ............ | 296/100.07 |
| 5,531,497 A * | 7/1996 | Cheng | ............ | 296/100.01 |
| 5,873,210 A * | 2/1999 | Brumleve | ............ | 296/100.17 |
| 6,505,879 B1 * | 1/2003 | Arviso | ............ | 296/100.18 |
| 6,666,490 B1 * | 12/2003 | Thacker | ............ | 296/26.07 |
| D489,673 S * | 5/2004 | Block | ............ | D12/404 |
| 7,207,614 B2 * | 4/2007 | Briggs | ............ | 296/26.06 |
| 7,322,499 B2 * | 1/2008 | Storer | ............ | 224/405 |
| D586,722 S * | 2/2009 | Miller et al. | ............ | D12/413 |
| D638,343 S * | 5/2011 | Kramer | ............ | D12/403 |
| 2003/0071062 A1 * | 4/2003 | Miller et al. | ............ | 222/135 |
| 2003/0168879 A1 * | 9/2003 | Grudek | ............ | 296/100.15 |
| 2010/0327618 A1 * | 12/2010 | Soldatelli | ............ | 296/100.1 |

* cited by examiner

*Primary Examiner* — Kiran B Patel
(74) *Attorney, Agent, or Firm* — John R. Benefiel

(57) ABSTRACT

A base support assembly for the cargo bed of a pickup truck mounted on the truck including a pair of parallel side by side slotted side guide rails installed on a respective cargo bed sidewall and a pair of U-shaped end support frames each having a pair of legs pivotally mounted to each of the opposite ends of the side guide rails so as to able to be swung up to an erect position or lowered down position after the base support assembly is installed on the pickup truck cargo bed side walls. An elongated slotted top guide rail may be connected at either end to the top of each end support frame. The end frames can be collapsed into a support for a rigid tonneau cover by lowering the end support frames.

3 Claims, 7 Drawing Sheets

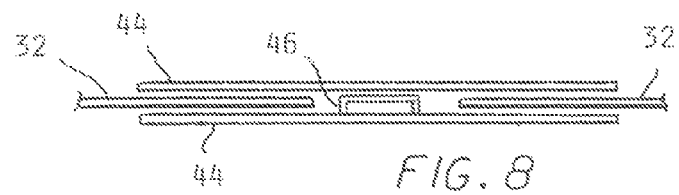
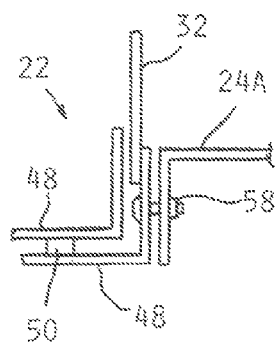
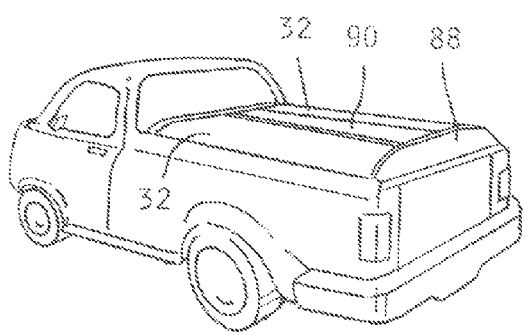
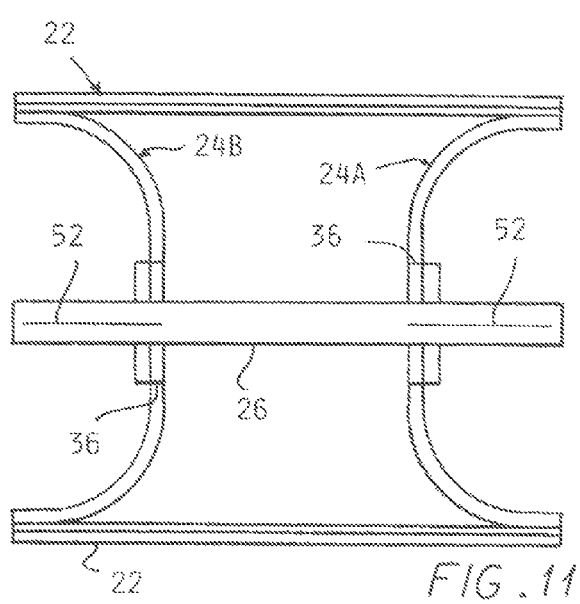

COLLAPSIBLE BASE SUPPORT ASSEMBLY FOR PICKUP TRUCK CARGO BED AND TONNEAU COVER

CROSS REFERENCE TO RELATED APPLICATIONS

This application is a division of U.S. Ser. No. 12/703,822 filed on Feb. 11, 2010 which claims the benefit of provisional application No. 61/151,930 filed on Feb. 12, 2009.

BACKGROUND OF THE INVENTION

This invention concerns caps and tonneau covers for pickup truck cargo beds which are used to enclose the normally open cargo bed for various well known purposes.

Such caps have typically been sold and installed as unitary structures which are bulky to ship, install and to store when removed from the truck. A further disadvantage is each cap must be built to match the dimensions of each truck cargo bed.

The typical cap also precludes the presence of truck bed racks which are used to carry long cargo items such as ladders, lumber, pipes, etc.

Collapsible caps have been proposed such as shown in U.S. Pat. No. 7,243,965 which allows conversions to a tonneau cover, but these involve complex arrangements and also suffer from many of the drawbacks of unitary construction described above.

It is an object of the present invention to provide a cap and rigid tonneau cover support assembly for a pickup truck cargo bed which need not be shipped, installed or stored as a unitary structure, and which can be adapted to varying size cargo beds and be easily and also can allow the presence of cargo racks attached to the cargo bed.

SUMMARY OF THE INVENTION

The above recited object and other objects which will be understood upon a reading of the following specification and claims are achieved by a base support assembly which is adapted to be mounted on the cargo bed of a pickup truck, comprised of a pair of side guide rails each mounted to one side wall of the cargo bed. A U-shaped front and rear support frame each have a pair of legs pivotally connected to adjacent front or rear ends of the guide rails to be able to be swung between a position lying down on the side guide rails to an upright erect position.

A pair of flexible side panels of plastic or metal, may be installed extending between a respective side of the top support guide and a respective side guide rail and held flexed in a curved convex shape with side edges received into lengthwise slots defined along each of the side rail guides with the support frames to form a cap, or the side panels may extend generally horizontally when the support frames are lowered to provide a rigid tonneau cover.

The end support frames may be adjustable in width.

The rigid tonneau cover is provided by lowering the end support frames and installing the side panels overlapping each other and extending over the lowered end support frames. They may be held in a shallowly convex shape by the ends being received in upwardly projecting lips on each of the lowered end support frames.

DESCRIPTION OF THE DRAWINGS

FIG. 8 is an enlarged cross sectional view through a top guide rail with fragmentary portions of side panels inserted therein.

FIG. 9 is a bottom view of a top guide rail configured to be hinged to the top of the end support frame with slots for accommodating travel of pins hinged to the end support frame.

FIG. 10 is an enlarged end view of a side guide rail showing a fragmentary end of a side panel inserted therein and a portion of a pivotally connected end support frame.

FIG. 11 is a diagrammatic top view of a base support frame assembly in which the top guide rail is hinged to the end support frames which are folded down.

FIG. 16 is a pictorial view of a pickup truck with a cap according to the invention shown converted to a tonneau cover.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
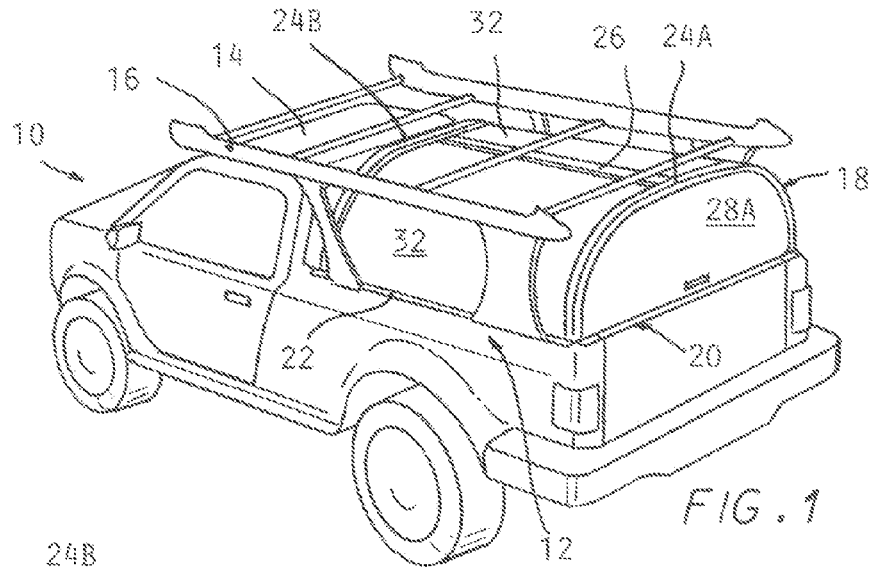
FIG. 1 is a simplified pictorial view of a cap according to the present invention installed on a cargo bed of a pickup truck also having a cargo rack which extends over the cap.
Figure 1A:
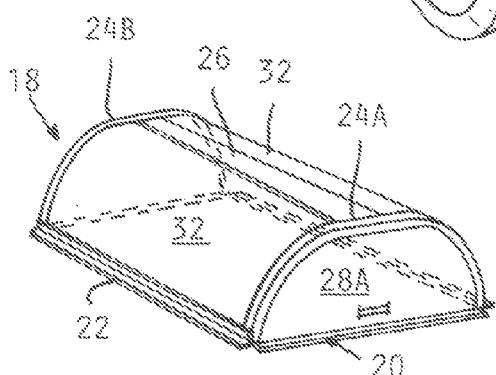
FIG. 1A is a simplified pictorial view of the cap shown in FIG. 1.
Figure 1B:
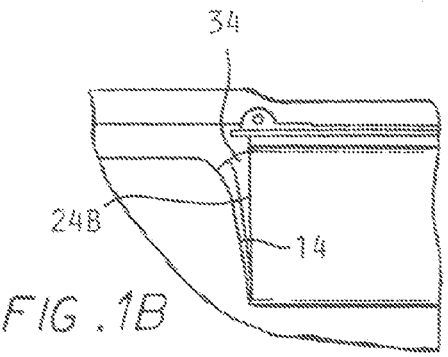
FIG. 1B is a fragmentary side view of the cap showing a sealing gasket between the forward ends of the cap and the back of the truck cabin.

Referring to the drawings and in particular, FIGS. 1A and 1B, a conventional pickup truck 10 is shown having a cargo bed 12 located to the rear of the passenger cab 14. A cargo rack 16 can be installed on the cargo bed 14 at the same time due to the compactness of the cap 18. Such a cargo bed mounted rack is shown in published application U.S. 2006/0163300 and Pat. No. D529,858 to the present inventor.

The cap 18 includes a base support frame assembly 20 according to the invention, comprised of a pair of parallel side guide rails 22 each installed atop a respective sidewall of the cargo bed 12 as with suitable fasteners and a pair of U-shaped end support frames 24A,24B each mounted to opposite ends of the side guide rails 22. The end support frames 24A,24B can be constructed from members of various configurations, including extruded square tubes, solid members, angles, channels, etc.

A top guide rail 26 extends between the tops of erected the end support frames 24A,24B and is secured thereto by simply being assembled thereto after raising of the support frames 24A, 24B attached with fasteners or can be mounted to remain attached when the end support frames are raised and lowered as described below.

A hinged window panel 28 is mounted within the rear end support frame 24A and is hinged thereto to allow opening of the window 28. A fixed plastic panel 30 is mounted fixed to the front end support frame 24B.

A pair of flexible side panels 32 are installed extending between the top support guide 26 and each of the side guide rails 22 and held so as to be bowed out to assume a convex curved shape as shown.

Each of the long side edges of the side panels 32 are received in slots defined in the side guide rails 22 and in the top guide rails 26 to be captured to cause them to assume the convex curved shape which is further secured by the ends being conformed to the U-shape of the end support frames 24A, 24B.

Front and rear end panels 28B, 28A can be installed in each end support frame 24A, 24B to completely enclose the cargo space.

Figure 1C:
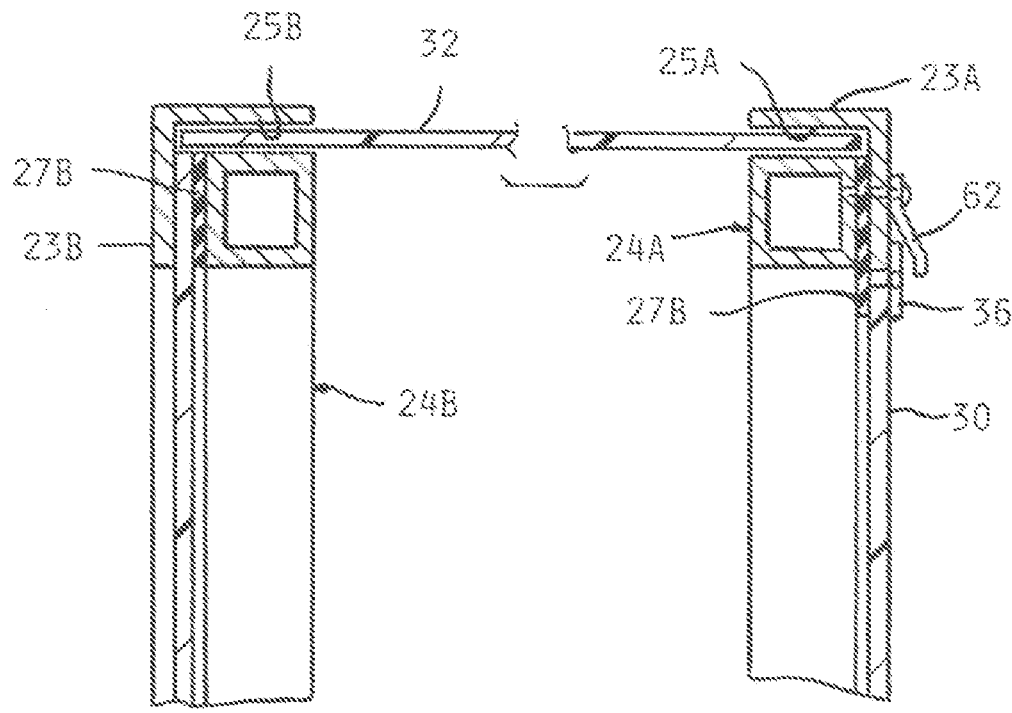
FIG. 1C is an enlarged fragmentary sectional view through the front and rear u-shaped end support frames showing the side panel ends secured thereto.

The end edges of the side panels 32 can be received in slots 25A,25B defined about the perimeter of each end support frame 24A,24B. In FIG. 1C, the front end support frame 24B comprised of formed square tubing pieces, has an angle 23B installed thereon sandwiching a seal 27B and the panel 28B against the end support frame 24B as with screws or rivets (not shown). The angle 23B is shaped to match the end support frame 24B and may be curved in section to provide more pleasing appearance.

The top leg of angle 23B is spaced above the top of the end support frame 24B as a lip to define the slot 25B into which the end edge of the panel 32 is inserted.

The rear end support frame 24A has an angle 23A assembled thereover after the side panel 32 has been installed with three edges secured in the slots of the side guide rails 22 and top guide rail 26 to form a lip to capture the end edge of the side panels 32 and make it conform to the convex shape of the end support frame. The rear window 30 is recessed within the lower leg of the angle 23A and hinged thereto at 36. A weather strip 62 can be provided.

Figure 1D:
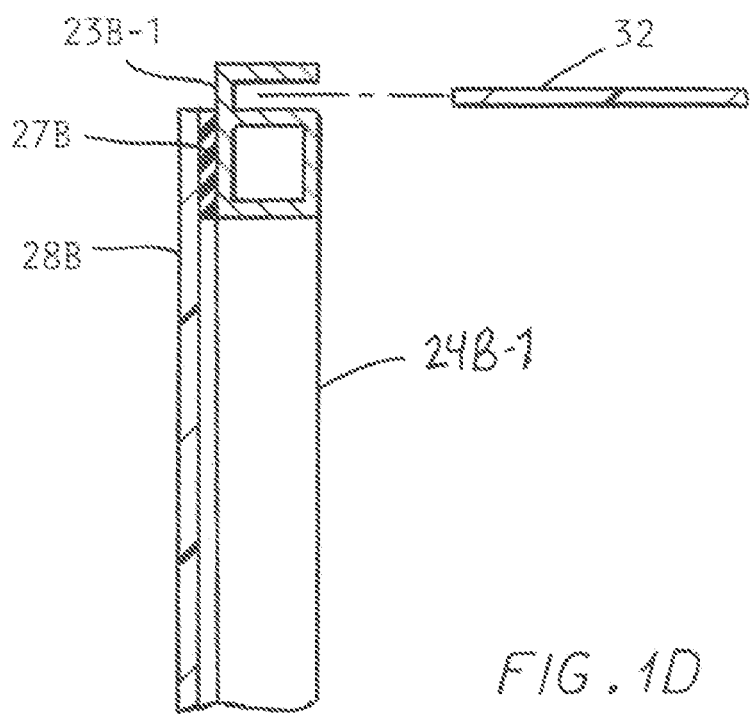
FIG. 1D is a sectional view through the front end support frame showing an alternate construction thereof.

FIG. 1D shows that the angle 23B can be replaced with web 23B-1 forming a lip fixed to the front end support frame 24B-1. The front end panel 28B can be secured to the frame 24B-1 with an adhesive seal or fasteners (not shown).

Figure 2:
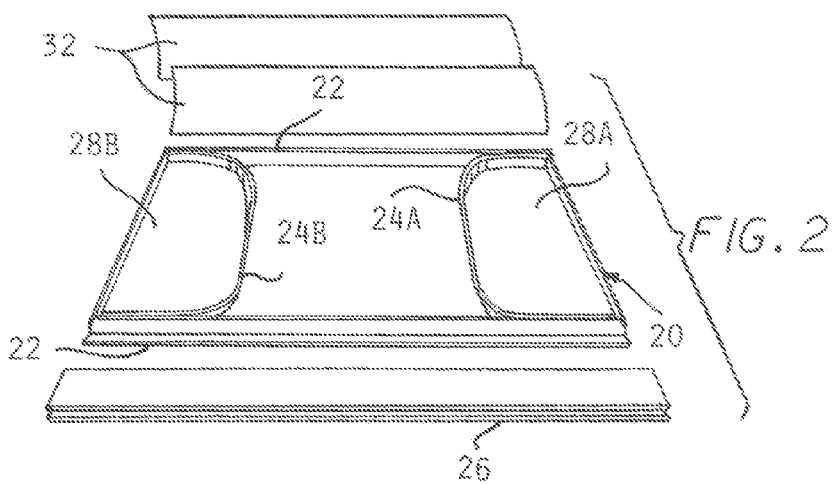
FIG. 2 is a pictorial view of the major components of a kit from which the cap shown in FIG. 1 can be assembled.

The cap 18 may be assembled by one person in place onto the truck cargo bed 12, with the components able to be shipped or stored flat as seen in FIG. 2. The side panels 32 can also be obtained locally, and are comprised of sheets of bendable plastic or metal cut to size, and may optionally be printed with any desired graphics.

The end support frames 24A, 24B have leg portions which are pivotally mounted to the ends of the side guide rails 22 to be able to be swung down and lie generally horizontally, approximately parallel to the plane defined by the side rails 22 as seen in FIG. 2.

Figure 3:
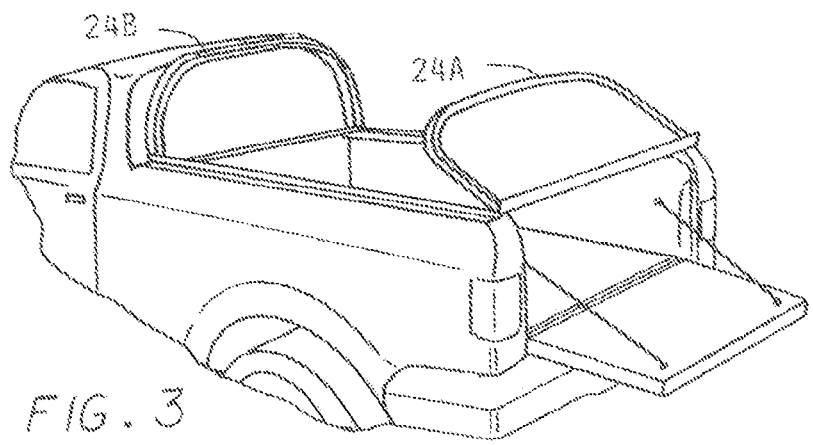
FIG. 3 is a fragmentary pictorial view of a base support frame assembly installed on a cargo bed with the end support frames partially erected.
Figure 4:
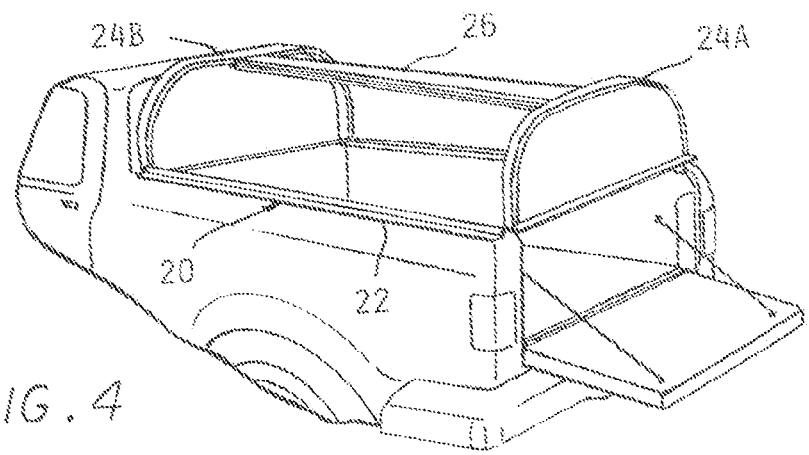
FIG. 4 is a fragmentary pictorial view as in FIG. 3 with a top guide rail installed on the erected end support frames.

To assemble, the base support frame assembly 20 is slid into the cargo bed 12 as seen in FIG. 3 and thereafter side guide rails 22 located atop the cargo bed side walls and secured thereto with suitable fasteners. The end support frames 24A, 24B are then pivoted to an upright position as seen in FIGS. 3 and 4, and the center guide support 26 installed affixed at either end to the top of each end support frame 24A, 24B (FIG. 4). The center guide support 26 may also be made a part of the base support frame assembly 20 as described below.

Figure 5:
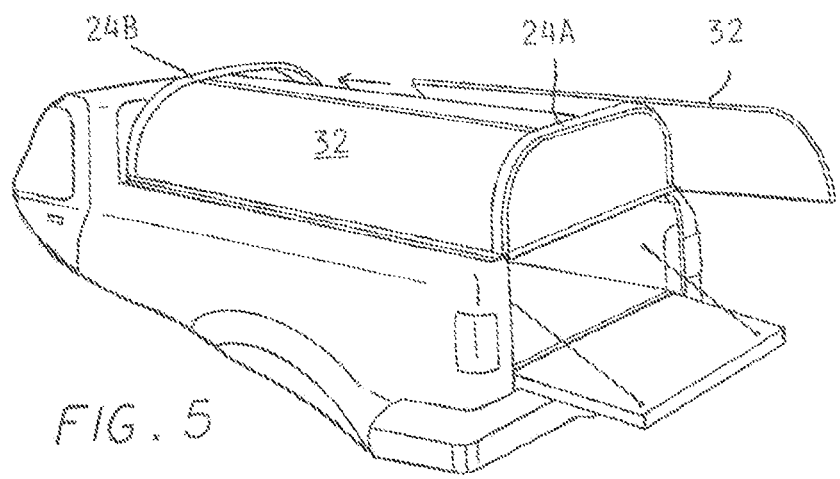
FIG. 5 is a pictorial view of a truck having the side panels being installed in the base support frame assembly.
Figure 6:
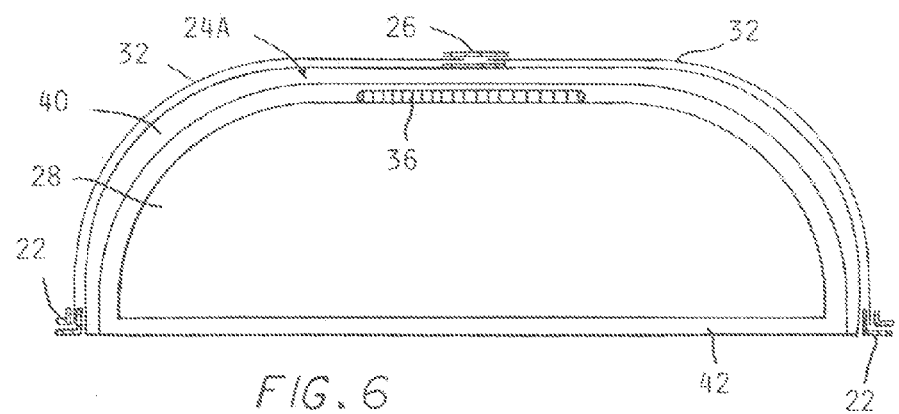
FIG. 6 is a rear end view of a cap according to the invention having an adjustable width end support frame.

Next, the side panels 32 each slide endwise into the slots in the respective side guide rail 22 and center guide support 26 as shown in FIG. 5. The end edges may be captured by the front end support frame 24B by a metal lip 25B.

As seen in FIG. 1B, a wedge shape sealing piece 34 may be is provided installed between the rear of the passenger cabin 14 and the cap 18.

FIGS. 6-10 show various further details which may be incorporated in a cap 18.

The rear end panel preferably is comprised of a window 30 which may be mounted by a piano hinge 36 supported by the top of the rear end support frame 24A as described above.

The side panels 32 shaped into conformity to the outer perimeter of the end support frames 24A, 24B as described above and indicated in FIG. 6. A seal 40 can be provided therebetween.

A sealing strip 42 (FIG. 6) can also be provided about the perimeter of the window 30.

As seen in FIG. 8, the top guide rail 26 can be constructed of a pair of thin aluminum sheets 44 attached or welded to a spacer channel 46 to create opposite spaces receiving the upper side edge of each side panel 32 (FIG. 8) or may be formed as an extrusion.

The side guide rails 22 can be constructed of a pair of aluminum angles 48 held apart but fixed together with spacers 50 to create a vertical space forming slots into which the bottom side edges of the side panels 32 are received (FIG. 10). This also allows drainage of water entering the slots. The side guide rails 22 can also be made as an extrusion 58.

Figure 7:
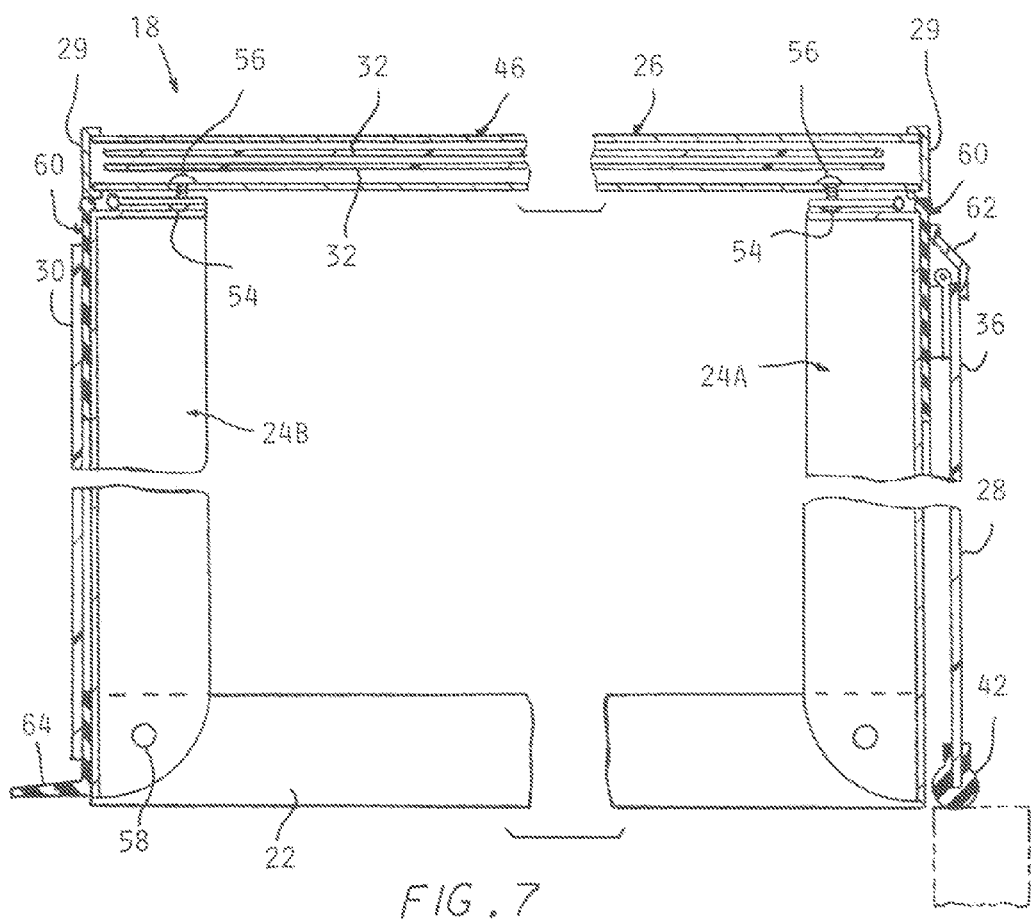
FIG. 7 is a fragmentary view of a lengthwise section through the cap shown in FIG. 6.

The bottom ends of the legs of the end support frames 24A, 24B (which are here configured as formed angles) are pivotally attached to the side guide rails 22 as shown in FIG. 7 to allow the raising and lowering necessary to install or collapse the cap 18.

The bottom ends of the legs of the end support frames 24A, 24B are rounded as seen in FIG. 7 to accommodate the downward pivoting.

The top guide rail 26 can be permanently secured to the end support frames 24A, 24B at either end while still allowing the pivoting up and down of the ends support frames 24A, 24B by means of a pin and slot connection including lengthwise slots 52 at either end (FIG. 9).

Further details of a cap 18 according to the invention having such a top guide 26 support are shown in FIG. 7, which shows a hinge 54 at each end connected to the bottom of the channel 46 by a sliding rivet pin 56.

One strap of the hinge 54 is attached to the top of a respective end support frame 24A, 24B.

End pieces 29 are secured to either end of the top guide rail 26.

Figure 12:
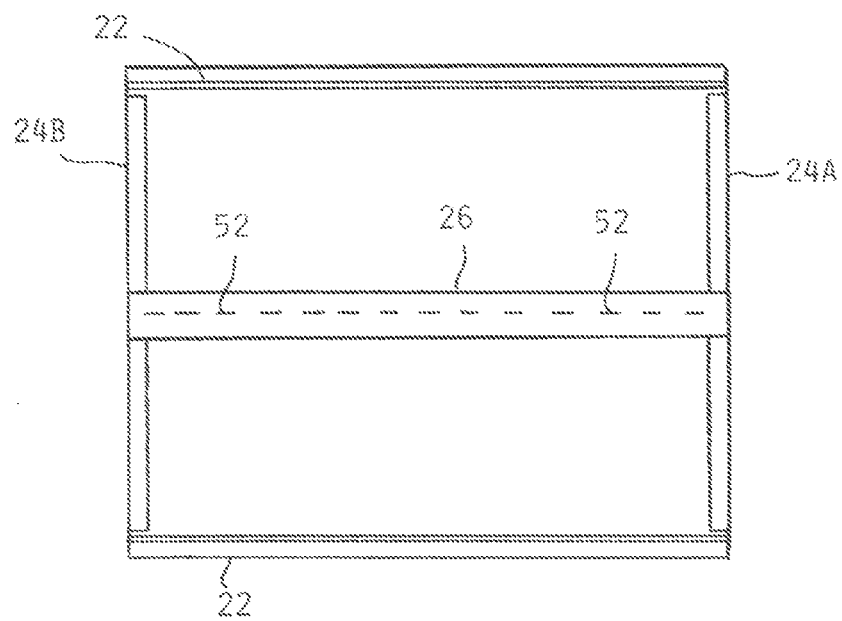
FIG. 12 is a top view of the base support frame assembly with the end support frames in the erected position.

As the end support frames 24A, 24B are swung down about pivots 58, the hinges 54 open up and the pins 56 slide down slots 52 as seen in FIGS. 11 and 12.

As also seen in FIG. 7, a rubber seal 42 may be fit to the edges of three sides of the window 30.

In addition a rubber seal spacer 60 as seen in FIG. 7 extends around the outer perimeter of the end support frames 24A, 24B with an enlarged bead portion filling the gap between the top guide support and the end support frames 24A, 24B.

The front plastic end panel 28B (FIG. 7) is pressed against the spacer portion and held by an adhesive or by fasteners (not shown).

A weather shield piece 62 (FIG. 7) covers the window edge, and a rubber shield 64 extends onto and across the rear wall of the cargo bed 12.

Figure 13:
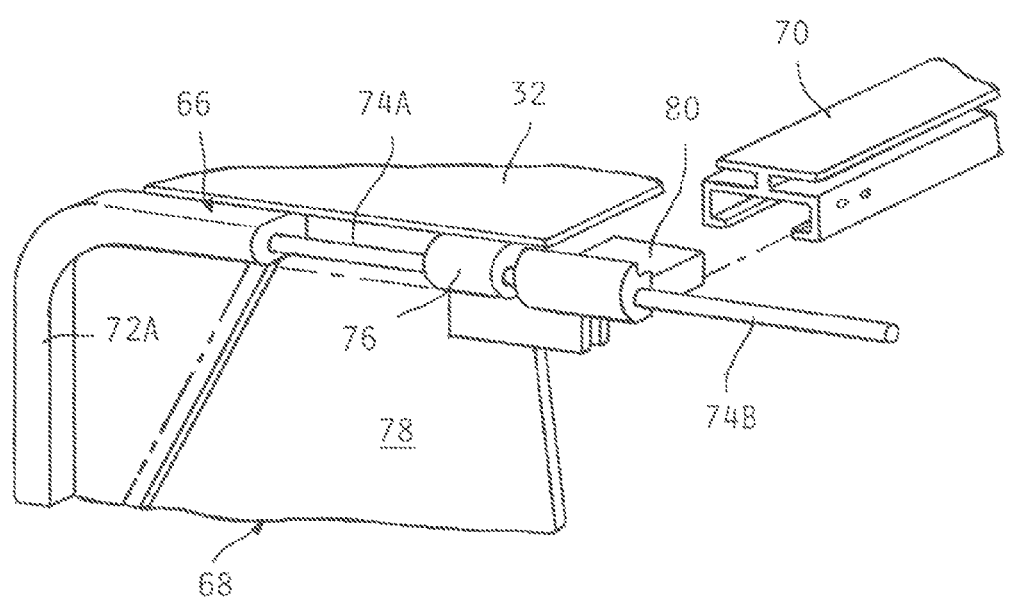
FIG. 13 is a fragmentary pictorial view of an alternate view of an adjustable width rear end support frame with an adjustable width window assembly.
Figure 14:
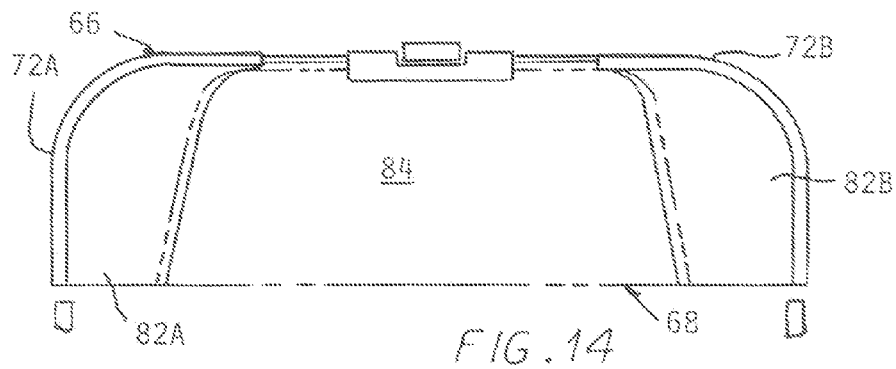
FIG. 14 is a rear view of the rear end support frame and window assembly shown in FIG. 13 in the widest adjustment position.
Figure 15:
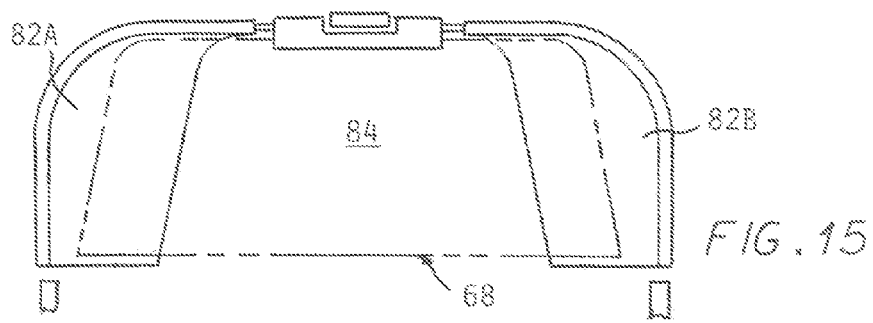
FIG. 15 is a rear view of the rear end support frame and window assembly shown in FIG. 13 in the narrowest adjusted position.

FIGS. 13-15 show an adjustable width rear end support frame 66 and multisection window assembly 68, and a modified form of the top guide rail 70.

The adjustable width end support frame 66 is comprised of end segments 72A, 72B slidably receiving respective rods 74A, 74B. The rods 74A, 74B are held in a center piece-hinge 76 for the window center section 78.

The modified top support rail 70 is configured to receive and retain a mounting plug 80 of the center piece-hinge 76.

The window assembly 68 also includes two side sections 82A, 82B which are attached to the inside of the end support frames 72A, 72B to be moved therewith when width adjustments are being made. The side sections 82A, 82B overlap behind a center panel 84 to accommodate width adjustments.

Figure 17:
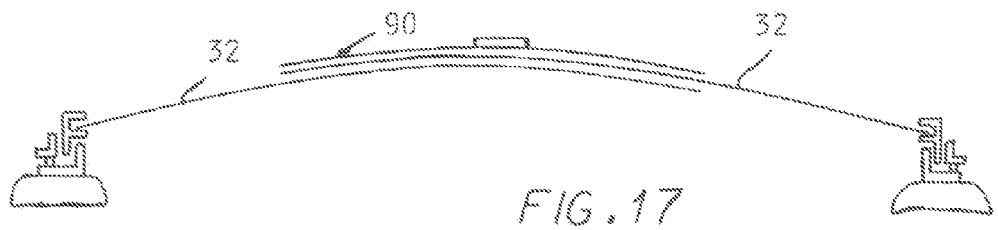
FIG. 17 is an end view of the cap converted to a hard tonneau cover using a special form of the top guide rail.
Figure 18:
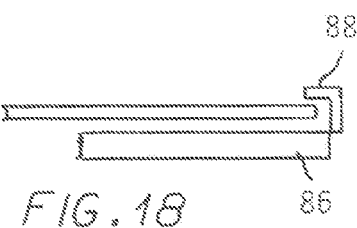
FIG. 18 is a fragmentary sectional view of the end of one of the overlapped side panels shown in FIG. 17 received in a guide channel on an end support frame.

The cap 18 can be collapsed to be converted into a hard panel tonneau cover as shown in FIGS. 16-20 by removing the top guide rail 26 and side panels 32 and lowering the end support frames 24A, 24B. In this embodiment, the end support frames 86 are formed with an upwardly projecting shallowly curved lip 88 (FIG. 19) which defines a convex shape of said panels 32 which are reinstalled with an overlapping relationship (FIG. 17).

In this embodiment, a special extra wide top guide rail 90 may be used to cover the lap joint of side panels 32. A power operation can be provided by a suitable electric driven linkage causing lowering of the end support frames 24A,24B.

Figure 20:
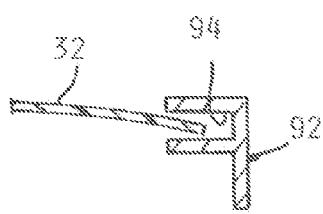
FIG. 20 is an end view of a tonneau cover adapter mated with a side rail guide, with a fragmentary view of an edge of a side panel received therein.
Figure 19:
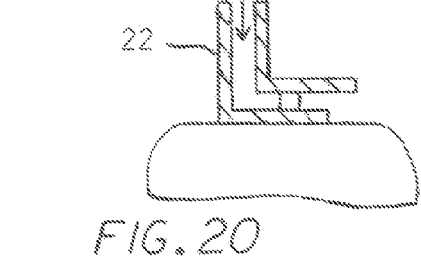
FIG. 19 is a pictorial view of one of the end support frames folded down with an upward projecting lip edge.

FIG. 20 shows an adapter 92 for the side rail guides 22 to provide a generally horizontal slot 94 to be more closely aligned with the orientation of the side panels 32 when used as a tonneau cover.

Thus, a simple base support assembly for a cap and tonneau cover is provided which is low in cost to manufacture and can be shipped and/or stored in a compact space, and is easily adapted to different width cargo beds, and can be installed or removed by one person.

The invention claimed is:

1. A collapsible base support assembly adapted to be mounted on a cargo bed of a pickup truck comprising:
   a pair of elongated side-by-side parallel side guide rails adapted to be connected to the top of a respective side wall of said cargo bed extending from the front to the rear thereof;
   said side guide rails each having an upward facing slot extending along the length thereof;
   a pair of generally U-shaped end support frames connected to a respective set of front and rear ends of said side guide rails, each end support frame having a pair of legs each of said legs pivoted to a respective set of adjacent front or rear ends of said side guide rails to be able to be swung to an upright position and lowered to a down position aligned with said side guide rails.

2. The collapsible base support assembly according to claim 1 further including a pair of flexible side panels each having side edges able to be inserted in said slots of a respective side guide rails and a respective slot of a top guide rail mounted to a top portion of both of said end support frames, said panels extending over a portion of said cargo bed to completely cover the same.

3. The collapsible base support assembly according to claim 1 wherein said panels are curved up and over said end support frames with said end support frames in a swung up position to provide a cap covering said cargo bed.

* * * * *